Figure 1:
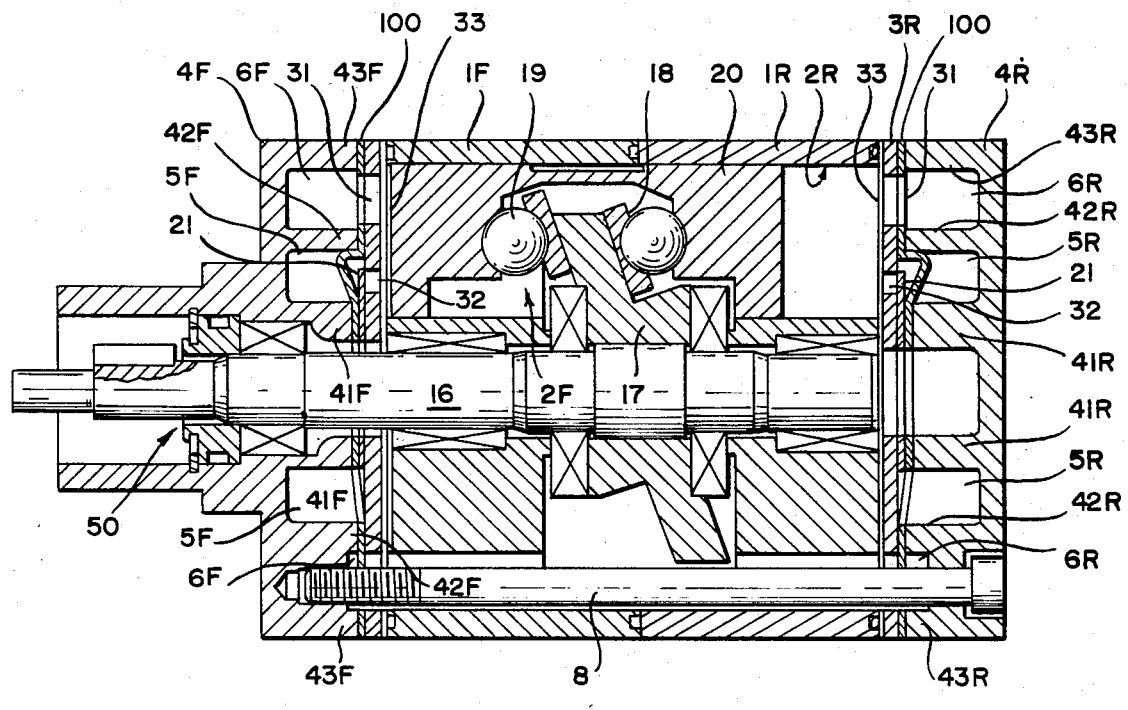

United States Patent [19]

Yoshimura et al.

[11] Patent Number: 4,503,179
[45] Date of Patent: Mar. 5, 1985

[54] AQUEOUS FLUORINE-CONTAINING RUBBER COATING COMPOSITION AND ARTICLE COATED THEREWITH

[75] Inventors: Tatsushiro Yoshimura; Tsutomu Terada, both of Takatsuki; Shozo Nakayama, Kariya, all of Japan

[73] Assignees: Daikin Kogyo Co., Ltd., Osaka; Kabushikikaisha Tyoda Jidoshokki Seisakusho, Aichi, both of Japan

[21] Appl. No.: 348,370

[22] Filed: Feb. 12, 1982

[30] Foreign Application Priority Data

Feb. 13, 1981 [JP] Japan .................... 56-20414

[51] Int. Cl.³ .............................................. C08K 5/54
[52] U.S. Cl. .................................... 524/262; 524/188; 524/462; 524/463
[58] Field of Search .............. 524/262, 188, 462, 463; 525/199; 106/287.11

[56] References Cited

U.S. PATENT DOCUMENTS

| | | | |
|---|---|---|---|
| 3,019,206 | 1/1962 | Robb | 525/199 |
| 3,649,320 | 3/1972 | Yates | 106/287.11 |
| 3,765,932 | 10/1973 | Kokubo et al. | 525/199 |
| 3,904,575 | 9/1975 | Satokawa et al. | 525/199 |
| 4,005,157 | 1/1977 | Mattiussi et al. | 525/199 |
| 4,228,061 | 10/1980 | Plueddemann | 524/262 |
| 4,243,770 | 1/1981 | Tatemoto et al. | 525/331 |
| 4,339,553 | 7/1982 | Yoshimura et al. | 524/544 |

FOREIGN PATENT DOCUMENTS 145431 4/1975 Japan .

Primary Examiner—A. Lionel Clingman
Assistant Examiner—Amelia B. Yarbrough
Attorney, Agent, or Firm—Birch, Stewart, Kolasch & Birch

[57] ABSTRACT

An aqueous fluorine-containing rubber coating composition comprising (a) fluorine-containing rubber, (b) fluorine-containing resin, (c) an aminosilane compound of the formula:

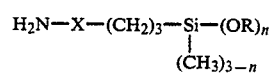

$$H_2N-X-(CH_2)_3-Si-(OR)_n$$
$$(CH_3)_{3-n}$$

wherein R is methyl or ethyl; X is a single bond or $-(CH_2)_2-NH-$, $-CONH-$ or $-(CH_2)_2-NH-(CH_2)_2-NH-$; and n is 2 or 3, and (d) an aqueous liquid vehicle, the weight ratio of the component (a) and the component (b) being from 95:5 to 35:65, which makes the resultant coating film non-adherent and more lubricous.

20 Claims, 2 Drawing Figures

U.S. Patent   Mar. 5, 1985   4,503,179

AQUEOUS FLUORINE-CONTAINING RUBBER COATING COMPOSITION AND ARTICLE COATED THEREWITH

The present invention relates to an aqueous fluorine-containing rubber coating composition and an article coated therewith. More particularly, it relates to an aqueous coating composition comprising a fluorine-containing rubber, a fluorine-containing resin, an aminosilane compound and an aqueous liquid vehicle, and an article at least partly coated with said coating composition.

Since a fluorine-containing rubber has good resistance to heat, weather, oils, solvents and chemicals, a coating composition comprising the same is widely used for coating various kinds of substrates such as metals, plastics, rubbers, fabrics, non-woven fabrics and fibers.

It was previously found that the incorporation of an aminosilane compound bearing an amino group at the molecular end into a fluorine-containing rubber coating composition is effective in improvement of various properties of such composition. Thus, the resulting composition is not gelled and has an excellent self adhesivity to a substrate with a long pot life. Further, it can be used for spray coating without cobwebbing even when the fluorine-containing rubber content is high (cf. Japanese Patent Publication (unexamined) No. 28249/1981). Furthermore, it can afford a coating film excellent in mechanical properties, particularly tensile strength by incorporating therein an amine compound having at least one amino group directly bonded to an aliphatic hydrocarbon group (cf. Japanese Patent Publication (unexamined) No. 47455/1981).

As a result of the extensive study to improve non-adhesiveness and lubricity of a coating film formed from the said fluorine-containing rubber coating composition, it has been found that the incorporation of a certain specific amount of a fluorine-containing resin into such composition is effective to make the resultant coating film non-adherent and more lubricous. It has also been found that the additional incorporation of an inorganic fibrous material therein is effective in improvement of the recovery of the resulting coating film from compression.

According to the present invention, there is provided an aqueous fluorine-containing rubber coating composition comprising (a) a fluorine-containing rubber, (b) a fluorine-containing resin, (c) an aminosilane compound of the formula:

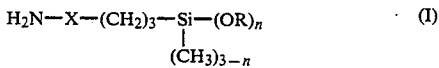

wherein R is methyl or ethyl, X is a single bond or —(CH$_2$)$_2$—NH—, —CONH— or —(CH$_2$)$_2$—NH—(CH$_2$)$_2$—NH— and n is 2 or 3, and (d) an aqueous liquid vehicle. Optionally, an inorganic fibrous material, an amine compound having at least one amino group directly bonded to an aliphatic hydrocarbon group, etc. may be incorporated therein.

The reason why the incorporation of the fluorine-containing resin improves the non-adhesiveness and lubricity of the coating film without any substantial influence on the adhesivity to the substrate as well as the mechanical properties is presumed as follows: the fluorine-containing resin which per se has non-adhesiveness and lubricity concentrates near the surface of the coating film so that performances of the fluorine-containing resin appear on the surface of the coating film without reducing the adhesivity to the substrate and mechanical properties. In fact, it was confirmed by X-ray fluorometry that the fluorine content of the coating film of 50μ thick cured at 300° C. for 30 minutes at the surface is about 1.5 times that of said coating film at the bonded face to the substrate. Higher curing temperatures tend to give greater differences in the fluorine content between them.

The fluorine-containing rubber (a) is a highly fluorinated elastic copolymer, preferably comprising about 40 to 85% by mol of units of vinylidene fluoride and about 60 to 15% by mol of units of at least one of other fluorine-containing ethylenically unsaturated monomers copolymerizable therewith. As the fluorine-containing rubber (a), there may be also used any fluorine-containing rubber bearing iodine on the polymer chain, preferably an elastic copolymer which bears about 0.001 to 10% by weight, particularly about 0.01 to 5% by weight of iodine, and comprises about 40 to 85% by mol of units of vinylidene fluoride and about 60 to 15% by mol of units of at least one of other fluorine-containing ethylenically unsaturated monomers copolymerizable therewith (cf. Japanese Patent Publication (unexamined) No. 40543/1977). Specific examples of the fluorine-containing ethylenically unsaturated monomers as above stated are hexafluoropropylene, pentafluoropropylene, trifluoroethylene, trifluorochloroethylene, tetrafluoroethylene, vinyl fluoride, perfluoro(methyl vinyl ether), perfluoro(ethyl vinyl ether), perfluoro(propyl vinyl ether), etc. Among various fluorine-containing rubbers, preferred are vinylidene fluoride/hexafluoropropylene copolymer, vinylidene fluoride/tetrafluoroethylene/hexafluoropropylene copolymer, etc.

Generally, the fluorine-containing rubber is used in the form of an aqueous dispersion. The aqueous dispersion may be an emulsion comprising the fluorine-containing rubber, which is obtainable by emulsion polymerization of the said monomers. Alternatively, the aqueous dispersion may be the one obtained by subjecting the said monomers to suspension or bulk polymerization or the like and dispersing the produced fluorine-containing rubber into an aqueous medium, if necessary, with previous pulverization and/or by the aid of any surfactant. The aqueous dispersion may contain from 10 to 70% by weight, preferably from 30 to 60% by weight of the fluorine-containing rubber. Such concentration can be suitably controlled by concentration or dilution. In addition to the surfactant, other conventional additives such as pigments, acid acceptors and fillers may be incorporated into the aqueous dispersion.

As the fluorine-containing resin (b), there are usable polytetrafluoroethylene, copolymers of tetrafluoroethylene and at least one of other ethylenically unsaturated monomers such as olefins (e.g. ethylene, propylene), haloolefins (e.g. hexafluoropropylene, vinylidene fluoride, chlorotrifluoroethylene, vinyl fluoride) and perfluoro(alkyl vinyl ethers), polychlorotrifluoroethylene, polyvinylidene fluoride, etc. Preferred fluorine-containing resins are polytetrafluoroethylene, copolymers of tetrafluoroethylene and at least one of hexafluoropropylene, perfluoro(methyl vinyl ether), perfluoro(ethyl vinyl ether) and perfluoro(propyl viny ether), usually the content of these monomers being not more than 40% by weight based on tetrafluoroethylene, etc.

In general, the fluorine-containing resin is used in the form of an aqueous dispersion. The aqueous dispersion may be an emulsion obtained by emulsion polymerization of the said monomers or a dispersion obtained by subjecting the said monomers to suspension or bulk polymerization and dispersing the produced resin into an aqueous medium, if necessary, with previous pulverization and/or by the aid of any surfactant.

The aminosilane compound (I) as the component (c) not only serves as a curing agent of the fluorine-containing rubber but also contributes to improvement of the adhesivity of the coating film. Specific examples of the aminosilane compound (I) are γ-aminopropyltriethoxysilane (hereinafter referred to as "A-1100"), N-β-aminoethyl-γ-aminopropyltrimethoxysilane, N-(trimethoxysilylpropyl)ethylenediamine, N-β-aminoethyl-γ-aminopropylmethyldimethoxysilane, β-ureidopropyltriethoxysilane β-aminoethyl-β-aminoethyl-γ-aminopropyltrimethoxysilane, etc.

The aqueous vehicle (d) may be water or a mixture of water with any water-miscible organic solvent. Examples of the water-miscible organic solvent include alcohols such as methanol, ethanol, propanol, ethyleneglycol, carbitol and cellosolve.

In addition to the above essential components (a) to (d), the coating composition of the invention may comprise optionally the inorganic fibrous material. Inclusion of the inorganic fibrous material is preferred for enhancing the recovery from compression. Examples of the inorganic fibrous material are glass fibers, carbon fibers, asbestos fibers, fibrous potassium titanate, etc. The average length of the inorganic fibrous material may be at least 1μ, preferably from 1 to 100μ.

The amino compound having at least one terminal amino group directly bonded to an aliphatic hydrocarbon group, which serves as a curing agent of the fluorine-containing rubber and also improves the mechanical properties of the coating film, may be incorporated in the coating composition as an optional component. Specific examples of the amino compound include monoamines (e.g. ethylamine, propylamine, butylamine, benzylamine, allylamine, n-amylamine, ethanolamine), diamines (e.g. ethylenediamine, trimethylenediamine, tetramethylenediamine, hexamethylenediamine, 3,9-bis(3-aminopropyl)-2,4,8,10-tetraoxaspiro-[5,5]undecane (hereinafter referred to as "V-11")) and polyamines (e.g. diethylenetriamine, triethylenetetraamine, tetraethylenepentaamine, pentaethylenehexaamine). Among them, those having at least two terminal amino groups are particularly preferred.

The coating composition of the invention may be prepared, for instance, by adding the aminosilane compound (I) and, if necessary, the amine compound to a mixture of the aqueous dispersions of the fluorine-containing rubber and of the fluorine-containing resin, followed by agitation to make a uniform mixture. Optional additives such as a pigment, an acid acceptor and a filler may be added previously to the mixture of the aqueous dispersions and/or ultimately to a mixture of the other components.

When the aminosilane compound (I) is added directly to the aqueous dispersion of the fluorine-containing rubber, the resultant mixture may become viscous to cause partial gellation. In order to prevent this gellation, it is preferred that the aminosilane compound is partly or completely hydrolized with water prior to its addition.

The weight ratio of the fluorine-containing rubber and the fluorine-containing resin may be usually from 95:5 to 35:65. When the content of the fluorine-containing resin is less than the lower limit, the non-adhesiveness and/or lubricity of the coating film are not satisfactorily improved. When the content is more than the upper limit, the coating film having a desired non-adhesiveness is hardly obtainable and cracks or pinholes tend to be formed.

The amount of the aminosilane compound (I) may be usually from 1 to 30 parts by weight, preferably from 1 to 20 parts by weight to 100 parts by weight of the fluorine-containing rubber. When the amine compound is added, the total amount of the aminosilane compound (I) and the amine compound may be within the above range, the molar ratio of the former and the latter being from 1:99 to 90:10.

The acid acceptor as one of the optional components may be a conventional one as used in curing the fluorine-containing rubber. Examples are oxides and hydroxides of divalent metals (e.g. magnesium, calcium, zinc, lead). As the filler, there may be exemplified silica, clay, diatomaceous earth, talc, carbon, etc.

The coating composition of the invention may be applied onto a substrate by a conventional procedure (e.g. brushing, dipping, spraying) and cured at a temperature usually of from room temperature to 400° C., preferably of from 100° to 400° C. for an appropriate period of time to give a coating film.

The fluorine-containing rubber coating film thus formed has excellent properties inherent to the fluorine-containing rubber and also has excellent adhesivity to the substrate and good mechanical properties, particularly tensile strength. Further, the coating film is provided with non-adhesiveness and lubricity at the surface.

Accordingly, the coating composition of the invention can be used effectively to make a coating film, for which non-adhesiveness and lubricity are required. For example, the coating composition may be coated on various gaskets, especially those made of metals such as iron, aluminum, copper and their alloys; packings; valve stem seals and lead valves in automobiles; rubber-made seal rings of hydraulic equipments; rolls for printing, weaving and paper machines; mixing rolls; bathes and blades for mixing of coating compositions; conveying belts for rubber or resin molds; belts for printing; belts for high-frequency heating; diaphragm; doctor knives and guides in decoloring, dying and washing steps in fiber or paper industry; rubber-made coupling members for domestic mixers; molds for molding resins; washing fixtures for precision machines; plating bathes or rinsing bathes; inner surfaces of fuel containers and chemical tanks; surfaces of resin or rubber linings; wires, etc. Also, it may be used for electro-conductive coating.

Metal gaskets for compressors in automobile coolers coated with a conventional fluorine-containing rubber coating composition have many disadvantages due to its adhesiveness to a sealing surface such as bad workability when the gasket is disassembled for replacement of the wear parts of the compressors, nonreusability of the disassembled gaskets and poor sealing properties due to the adhered residual rubber when the new parts are assembled. These disadvantages are, however, overcome by the metal gaskets coated with the coating composition of the invention due to their non-adhesiveness at the surface. The disassembled gaskets are sufficiently reusable.

Figure 2:
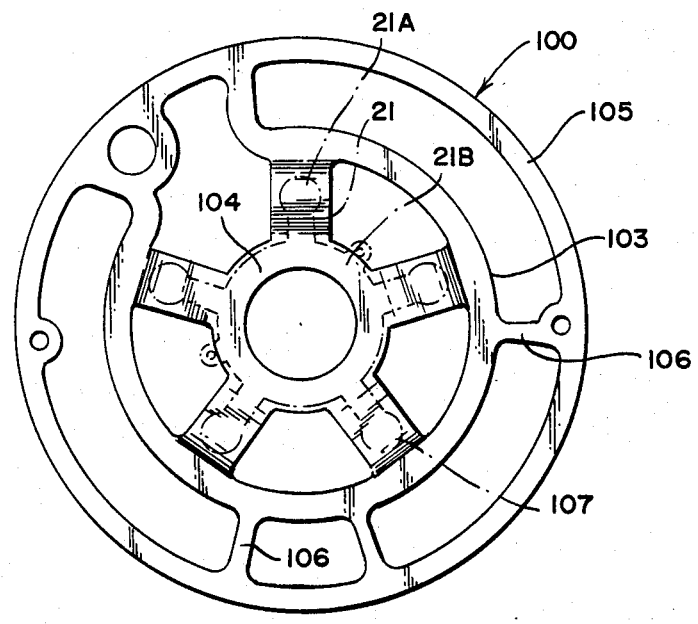

The invention will now be illustrated, by way of example, with reference to the accompanying drawings, in which:

FIG. 1 is a sectional view of a swash plate type compressor to be used for an automobile cooler, and FIG. 2 is a front view of a gasket to be used for the swash plate type compressor.

FIG. 1 shows a swash plate type compressor, in which each end of a pair of cylinder blocks 1F, 1R which longitudinally abut each other is respectively sealed with a front housing 4F and a rear housing 4R provided with valve plates 3F, 3R between the cylinder blocks and the housing. A driving shaft 16 is rotatably supported by the cylinder blocks 1F, 1R and extends through the most part of the central portion of the cylinder blocks. One end of the shaft 16 extends through and beyond the housing 4F and may be connected with a power source, and the outwardly extending part of the shaft 16 is provided with a shaft sealing member 50 in order to maintain airtightness. An adequate number of pairs of cylinder bores 2F, 2R are formed in the cylinder blocks in parallel with the driving shaft 16 on a circumference a center of which is the center of the driving shaft 16. Pistons 20 inserted in the cylinder bores 2F, 2R are engaged with a swash plate 17 slantingly fixed to the driving shaft 16 through bearings such as shoes 18 and balls 19. In the valve plates 3F, 3R, intake ports 31 and exhaust ports 32 which correspond to the cylinder bores 2F, 2R are perforated. Intake valve sheets 33 provided with intake lead valve members which can open and close the intake ports are held between the cylinder blocks 1F, 1R and the valve plate 3F, 3R respectively. Exhaust valve sheets 21 provided with exhaust lead valve members 21A which can open and close the exhaust ports are held between the housings 4F, 4R and the valve plates 3F, 3R respectively together with gasket 100, later described in detail, which is overlaid on the exhaust valve sheets and presses the exhaust valves. Within the interiors of the housings 4F, 4R, there formed a devided intake rooms 6F, 6R and exhaust rooms 5F, 5R which can communicate with the cylinder bores 2F, 2R through the intake ports 31 and the exhaust ports 32 respectively and also can communicate with an intake part and an exhaust part of an outer cooling circuit through a conventional member (not shown). Numeral 8 represents a clamping bolt which maintains the compressor assembled.

Hereinafter, the gasket 100 and the exhaust valve sheet 21 are described in detail.

In FIG. 2, the exhaust valve sheet 21 comprises a base ring 21 B and the radially protruded exhaust lead valve members 21A corresponding to the exhaust ports 32. The gasket 100 comprises (a) the first ring member 104 corresponding to interstructures 41F, 41R which separate the base ring 21B of the exhaust valve sheet 21 from the inner side of the exhaust room 41F, 41R of the housing 4F, 4R; (b) the second ring member 103 corresponding to interstructures 42F, 42R which separate the exhaust room 5F, 5R from the intake room 6F, 6R; (c) the third ring member 105 corresponding to the interstructures 43F, 43R which separate the outer side of the intake rooms 6F, 6R from the exterior of the compressor; (d) the rib members 106 bridging the second ring member 103 and the third ring member 105 at appropriate positions; and (e) and the rib members 107 bridging the first ring member 104 and the second ring member 103 at positions corresponding to the exhaust, lead valve members 21A of the exhaust valve sheet 21. The rib members 107 are bent such that the rib members 107 part more widely from the exhaust lead valve members 21A at the top of the latter and being constructed so as to act as retainers which restrain the deformation of the exhaust lead valve members 21A.

The coating composition of the invention is coated on the surface of the gasket 100 with even thickness of 20 to 50μ by a conventional method such as dipping and spray coating. The gasket may be prepared by precoating the coating composition of the invention on a plate material and blanking pressing the plate material to obtain a desired form gasket. Preferably, the gasket is prepared by first blank pressing the plate material without coating and then coating the coating composition on the pressed material. The latter process has advantages such that since the rupture cross-sections are coated with the coating composition, peeling of the film and rusting of the metal base material are prevented. The base material may be plate material made of metal such as iron, aluminum and copper and their alloys and plate material made of rigid plastics.

In the swash plate type compressor constructed as above, the pressed parts of the gasket 100, i.e. the first ring member 104, the second ring member 103 and the third ring member 105 are tightly sealed with the coating composition coated on the both surfaces. During the operation of the compressor, the driving shaft 16 is rotated with driving force transmitted from the outer power source, then the pistons 20 reciprocate in the cylinder bores 2F, 2R with the rotation of the swash plate 17, and intake, compressing and exhaust functions are effected. Details are as follows:

Refrigeration medium is introduced into the intake rooms 6F, 6R of the housing 4F, 4R from the intake part of the outer cooling circuit by the intake effect generated in the cylinder bores 2F, 2R. Then, the refrigeration medium opens the intake lead valve members of the intake valve sheet 33 and flows into the cylinder bores 2F, 2R from the intake ports 31. The medium is compressed in the cylinder bores 2F, 2R. Due to the exhaust effect of the cylinder bores, the compressed medium opens the exhaust lead valve members 21A of the exhaust valve sheet 21 and flows into the exhaust rooms 5F, 5R from the exhaust ports 32. Then, the medium is recycled to the outer cooling circuit. During the exhausting period, the exhaust lead valve members 21A which are deformed by the exhaust pressure of the medium are pressed on the rib members 107 of the gasket 100 which serve as the retainers, and the degree of deformation is restricted so that the failure of the exhaust lead valve members 21A is prevented. The film of the coating composition may absorb the shock when the exhaust lead valve members 21A hit the gasket, reduce the noise and prevent the failure of the exhaust lead valve members 21A.

The coating composition may, of course be applied to other type compressors such as reciprocal types and a rotary types (e.g. a vane type).

The coating composition of the invention may be coated on a seal ring of the hydraulic equipment and, due to the lubricity of the film, can reduce resistance to slip while maintaining the sealing properties and prevent the troubles such as the failure of working. In general, the lubricity of the film improves the stick-slip on the film surface and reduces the deformation and flaw of the film.

The coating composition has further advantages such that it has a long pot life, e.g. from two weeks to one month, and that even when the content of the fluorine-containing rubber is as high as 60% by weight, it can be spray coated without cobwebbing and affords thick film easily.

The present invention will be illustrated in detail by the following Examples wherein % and parts are by weight unless otherwise indicated.

EXAMPLES 1 TO 7 AND COMPARATIVE EXAMPLES 1 TO 4

Non-adhesiveness of Film Surface

The following composition A (containing 166 parts of the aqueous dispersion of fluorine-containing rubber) and the following composition B (10 parts) were homogeneously mixed and filtered through a 200 mesh wire mesh to prepare an aqueous fluorine-containing rubber coating composition:

|  | Part(s) |
|---|---|
| Composition A |  |
| Aqueous dispersion of fluorine-containing rubber[*1] (the rubber content being 60%, and Nonion HS-208 being contained) | 166 |
| Aqueous dispersion of fluorine-containing resin[*2] (the resin content being 50 or 60%, and Nonion HS-208 being contained) | amount as shown in Table 1 |
| Magnesium oxide | 3 |
| Medium thermal carbon | 20 |
| Nonion HS-208 (20% aqueous solution) | 2 |
| Water | 50 |
| Composition B |  |
| A-1100 | 40 |
| V-11 | 20 |
| Water | 40 |

Note
[*1] Vinylidene fluoride/tetrafluoroethylene/hexafluoropropylene elastic terpolymer (hereinafter referred to as the "fluorine rubber").
[*2] Polytetrafluoroethylene (hereinafter referred to as "PTFE") or tetrafluoroethylene/hexafluoropropylene copolymer (hereinafter referred to as "FEP").

The thus prepared coating composition was spray coated on an aluminum plate (100 mm × 50 mm × 1 mm) which had been degreased with acetone, dried at a temperature of 50° to 70° C. for ten minutes to form a film of 30μ thick and cured at 300° C. (in Examples 1 to 3) or at 380° C. (in Examples 4 to 7 and all Comparative Examples) for ten minutes.

Contact angle of water against the cured film was measured by dropping a drop of purified water on the surface at 24° C. with a goniometer (Elma Kogaku Kabushikikaisha).

The results are shown in Table 1.

TABLE 1

|  | Amount of the resin dispersion (parts) | Rubber/Resin (solid content ratio) | Contact angle (°) |
|---|---|---|---|
| Example 1 | FEP 60 | 23/77 | 103 |
| Example 2 | FEP 100 | 33/67 | 104 |
| Example 3 | FEP 200 | 50/50 | 108 |
| Example 4 | PTFE 50 | 23/77 | 110 |
| Example 5 | PTFE 83 | 33/67 | 113 |
| Example 6 | PTFE 167 | 50/50 | 116 |
| Example 7 | PTFE 250 | 60/40 | 116 |
| Comparative Example 1 | 0 | 0/100 | 76 |
| Comparative Example 2 | 0 | 0/100 | 99 |
| Comparative Example 3 | FEP 400 | 67/33 | *1 |
| Comparative Example 4 | PTFE 388 | 72/28 | *1 |

TABLE 1-continued

|  | Amount of the resin dispersion (parts) | Rubber/Resin (solid content ratio) | Contact angle (°) |
|---|---|---|---|
| Example 4 |  |  |  |

Note:
*1 Pinholes or cracks formed even at 10μ thick, and no film was obtained.

EXAMPLES 8 TO 14 AND COMPARATIVE EXAMPLES 5 AND 6

Lubricity of Film Surface

Friction coefficients of the film obtained in Examples 1 to 7 and Comparative Examples 1 and 2 were measured by a Bowden-Leben type equipment under the following conditions: temperature, 24° C.; steel ball, 8 mm; load, 250 g; linear speed, 0.2 cm/sec.

The results are shown in Table 2.

TABLE 2

|  | Film | Friction coefficient |
|---|---|---|
| Example 8 | Example 1 | 0.47 |
| Example 9 | Example 2 | 0.36 |
| Example 10 | Example 3 | 0.27 |
| Example 11 | Example 4 | 0.23 |
| Example 12 | Example 5 | 0.19 |
| Example 13 | Example 6 | 0.08 |
| Example 14 | Example 7 | 0.07 |
| Comparative Example 5 | Comparative Example 1 | 0.70 |
| Comparative Example 6 | Comparative Example 2 | 0.40 |

EXAMPLES 15 TO 17 AND COMPARATIVE EXAMPLES 7 TO 9

Bonding test

The following composition A' (100 parts) and the following composition B' (5 parts) were homogeneously mixed and filtered through a 200 mesh wire mesh to prepare an aqueous fluorine-containing rubber coating composition:

|  | Part(s) |
|---|---|
| Composition A' |  |
| Aqueous dispersion of the fluorine rubber (the rubber content being 60%, and Nonion HS-208 being contained) | 166 |
| Aqueous dispersion of FEP (FEP content being 50%, and Nonion HS-208 being contained) | 60 |
| Magnesium oxide | 3 |
| Medium thermal carbon | 20 |
| Water | 50 |
| Composition B' |  |
| Aminosilane compound (as shown in Table 3) | 90 |
| Water | 10 |

The thus prepared coating composition was spray coated on an aluminum plate (100 mm × 50 mm × 1 mm) which had been degreased with acetone or an iron plate (100 mm × 50 mm × 1 mm) which had been degreased with acetone and blasted with 80 mesh Tosa emery at a wind pressure of 5 kg/cm², and dried at a temperature of 50° to 70° C. Then, spraying and drying were repeated three times to obtain a film of 100 to 150μ thick. The film was cured at 150° C. for thirty minutes.

The cured film was cut into strips of 100 mm wide with the depth to the surface of the metal plate as the substrate. The 180° peeling test was conducted at 24° C. by peeling the end of the strip with an autograph "Shimadzu IS-500" at a rate of 50.0±2.5 mm/min.

The results are shown in Table 3.

TABLE 3

| | Aminosilane or amine | Peeling strength (kg/cm) | |
|---|---|---|---|
| | | Aluminum | Iron |
| Example 15 | A-1100 | 0.81*[3] | 1.01*[3] |
| Example 16 | A-1100 | 0.63*[3] | 0.61*[3] |
| Example 17 | A-1600*[1] | 0.24*[3] | 0.28*[3] |
| Comparative Example 7 | A-1125*[2] | Coating impossible due to gellation | |
| Comparative Example 8 | N,N—Dicinnamylidene-1,6-hexanediamine | 0.17*[4] | 0.16*[4] |
| Comparative Example 9 | V-11 | 0.05*[4] | 0.07*[4] |

Note:
*[1]NH$_2$CONH(CH$_2$)$_3$Si(OCH$_2$CH$_3$)$_3$.
*[2]CH$_3$CO(CH$_2$)$_2$NH(CH$_2$)$_2$NH(CH$_2$)$_3$Si(OCH$_3$)$_3$ (an aminosilane compound having no terminal amino group).
*[3]The film was destroyed.
*[4]Ply separation.

EXAMPLES 18 TO 21 AND COMPARATIVE EXAMPLES 10 AND 11

Tensile strength of film

A fluorine-containing rubber coating composition was prepared by mixing the composition A as used in Example 1 (containing 166 parts of the aqueous dispersion of the fluorine rubber) and the compositions B (amount as shown in Table 4) but containing A-1100 and V-11 in a proportion as shown in Table 4. In Example 18 and Comparative Examples 10 and 11, the composition B containing 0.01 mol of a mixture of A-1100 and the amine in a molar proportion of 1:1 was added to the composition A containing 166 parts of the aqueous dispersion of the fluorine rubber.

The results are shown in Table 4.

TABLE 4

| | Composition B (parts) | Aminosilane/Amine (molar ratio) | Tensile strength (kg/cm$^2$) |
|---|---|---|---|
| Example 18 | — | A-1100/V-11 (1/1) | 72 |
| Example 19 | 10 | A-1100/V-11 (72/28) | 92 |
| Example 20 | 15 | A-1100/V-11 (72/28) | 101 |
| Example 21 | 20 | A-1100/V-11 (72/28) | 111 |
| Comparative Example 10 | — | A-1100/Benzidine (1/1) | 15 |
| Comparative Example 11 | — | A-1100/V-3*[1] (1/1) | 13 |

Note:
*[1]N,N—Dicinnamylidene-1,6-hexane-diamine.

EXAMPLE 22

Pot life, spray coating and coated piece test

In the same manner as in Example 1, an aqueous fluroine-containing rubber coating composition was prepared from the following composition A″ (100 parts) and the composition B (5 parts) as used in Example 1:

| Composition A″ | Part(s) |
|---|---|
| Aqueous dispersion of the fluorine rubber (the rubber content being 60%, and Nonion HS-208 being contained) | 166 |
| Aqueous dispersion of FEP (FEP content being 50%, and Nonion HS-208 being contained) | 60 |
| Magnesium oxide | 3 |
| Medium thermal carbon | 20 |
| Nonion HS-210 (manufactured by Nippon Oil and Fats Co., Ltd.) | 2 |
| Water | 50 |

The thus prepared fluorine-containing rubber coating composition was stored in a 300 ml volume glass bottle with a cap at 24° C. Even after ten days, no gellation was observed, and the solid components could be redispersed.

The coating compositon was spray coated on a SPCC made gasket of a compressor for an automobile cooler under the following conditions: nozzle diameter, 0.8 mm; spray pressure, 3.0 kg/cm$^2$. Spray coating was effected without any trouble, and a film of about 30μ thick was obtained.

The obtained coated gasket was assembled in a compressor with a pressure of 300 kg/cm$^2$, and the compressor was operated at an exhaust gas temperature of about 120° C. (thus the gasket being exposed to the gas of 120° C.) for 500 hours. After operation, the compressor was disassembled. The gasket was easily removed from the seal surface, hardly swelled with the refrigeration medium (Flon gas R-12) and the refrigerator oil. The gasket was reusable.

For comparison, a gasket coated with a conventional fluorine-containing rubber or a gasket coated with nitrile rubber and treated with graphite in order to prevent bonding was assembled in a compressor, and the compressor was operated under the same conditions as above. After operation, the gasket was disassembled. In the case using the conventional fluorine-containing rubber, the gasket was bonded to the seal surface. It was difficult to remove the gasket, and a part of the rubber was peeled off. Thus, the gasket was not reusable. Further, the rubber was squeezed out beyond the circumference of the gasket. Also, in the case using the nitrile rubber, the rubber was squeezed out beyond the circumference of the gasket.

When the squeezed-out parts of the rubber exit during the operation of the compressor, they may form foreign particles in the circuit and bite the sliding surfaces and the surfaces of the valve sheet, which may cause trouble in operation.

EXAMPLE 23

Recovery from compression

The following composition A‴ (containing 166 parts of the fluorine rubber) and the composition B as used in Example 1 (30 parts) were mixed to make an aqueous fluorine-containing rubber coating composition:

| Composition A‴ | Part(s) |
|---|---|
| Aqueous dispersion of the fluorine rubber (the rubber content being 60%, and Nonion HS-208 being contained) | 166 |
| Aqueous dispersion of FEP (FEP content being 50%, and Nonion HS-208 being contained) | 60 |

-continued

| Composition A''' | Part(s) |
|---|---|
| Magnesium oxide | 3 |
| Medium thermal carbon | 20 |
| Fibrous potassium titanate | 6 |
| Nonion HS-208 (20% aqueous solution) | 2 |
| Water | 110 |

The coating composition was spray coated on an iron plate to form an even film of about 50μ thick. On the film surface, a metal ring was placed and heat pressed at 150° C. under a pressure of 300 kg/cm² for five minutes. After the ring was removed, no ring mark was observed on the pressed surface of the film. However, when a conventional aqueous fluorine-containing rubber coating composition (same as the composition A but not including the fluorine-containing resin and fibrous potassium titanate) was used, ring mark was observed on the pressed surface.

What is claimed is:

1. An aqueous fluorine-containing rubber coating composition comprising (a) fluorine-containing rubber, (b) fluorine-containing resin, (c) an aminosilane compound of the formula:

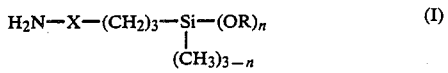  (I)

wherein R is methyl or ethyl; X is a single bond or —(CH₂)₂—NH—, —CONH— or —(CH₂)₂—NH—(CH₂)₂—NH—; and n is 2 or 3, and (d) an aqueous liquid vehicle, the weight ratio of the component (a) and the component (b) being from 95:5 to 35:65.

2. The coating composition according to claim 1 wherein the weight ratio of the aminosilane compound and the fluorine-containing rubber is from 1:100 to 30:100.

3. The coating composition according to claim 1 comprising additionally an inorganic fibrous material.

4. The coating composition according to claim 1 or 3 further comprising an amine compound having at least one terminal amino group directly attached to a hydrocarbon group.

5. The coating composition according to claim 1 wherein the amine compound has at least two terminal amino groups.

6. The coating composition according to claim 4 wherein the molar ratio of the aminosilane compound and the amine compound is from 1:99 to 90:10.

7. The coating composition according to claim 1 wherein the aminosilane compound is partly or completely prehydrolyzed.

8. The coating composition according to claim 3 wherein the inorganic fibrous material is glass fibers, carbon fibers, asbestos fibers or fibrous potassium titanate.

9. An article coated with the aqueous fluorine-containing rubber coating composition according to claim 1.

10. The article according to claim 9 which is a gasket.

11. The article according to claim 10 wherein the gasket is a metal-made gasket.

12. The article according to claim 11 wherein the metal is iron, aluminum or copper.

13. A coating composition according to claim 1, wherein said fluorine-containing rubber component (a) is a fluorinated elastic copolymer comprising about 40 to 85% by mol of units of vinylidene fluoride and about 60 to 15% by mol of units of at least one other fluorine-containing ethylenically unsaturated monomer copolymerizable therewith.

14. A coating composition according to claim 1, wherein said fluorine-containing resin component (b) is polytetrafluoroethylene or a copolymer of polytetrafluoroethylene and at least one ethylenically unsaturated monomer.

15. A coating composition according to claim 14, wherein said ethylenically unsaturated monomer is an olefin, a haloolefin, or a perfluoro(alkyl vinyl ether).

16. A coating composition according to claim 15, wherein said ethylenically unsaturated monomer is hexafluoropropylene, perfluoro(methyl vinyl ether), perfluoro(ethyl vinyl ether) or perfluoro(propyl vinyl ether).

17. An aqueous fluorine-containing rubber coating composition having improved non-adhesiveness and lubricity characteristics comprising (a) a fluorinated elastic copolymer comprising about 40 to 85% by mol of units of vinylidene fluoride and about 60 to 15% by mol of units of at least one other fluorine-containing ethylenically unsaturated monomer copolymerizable therewith, (b) a polytetrafluoroethylene or a copolymer of polytetrafluoroethylene and at least one ethylenically unsaturated monomer, (c) an aminosilane compound of the formula:

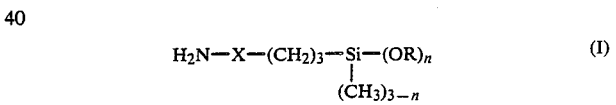  (I)

wherein R is methyl or ethyl; X is a single bond or —(CH₂)₂—NH—, —CONH— or —(CH₂)₂—NH—(CH₂)₂—NH—; and n is 2 or 3, and (d) an aqueous liquid vehicle, the weight ratio of the component (a) and the component (b) being from 95:5 to 35:65.

18. The coating composition according to claim 17, wherein the aminosilane compound is partly or completely prehydrolyzed.

19. An article coated with the aqueous fluorine-containing rubber coating composition according to claim 17.

20. A gasket coated with the aqueous fluorine-containing rubber coating composition according to claim 17.

* * * * *